UNITED STATES PATENT OFFICE.

ISRAEL AMIES, OF PHILADELPHIA, PENNSYLVANIA, ASSIGNOR TO JOHN A. JACKSON.

IMPROVEMENT IN VENEERS.

Specification forming part of Letters Patent No. 13,899, dated December 11, 1855; Reissue No. 741, dated June 21, 1859.

*To all whom it may concern:*

Be it known that I, ISRAEL AMIES, of the city of Philadelphia, in the State of Pennsylvania, have invented a new and Improved Veneer, applicable in the construction and ornamenting of furniture and other articles to which veneers are or may be applied; and I do hereby declare that the following is a full, clear, and exact description of the same.

The nature of my invention consists in producing, substantially as hereinafter described, veneers of plain and ornamental woods, with permanently raised or embossed figures thereon, having the appearance of real carvings, the said embossed veneers being applicable at any subsequent time, by gluing or otherwise, in the construction and ornamenting of furniture and other articles to which veneers are or may be applied.

In order to enable others skilled in the art to which it belongs to make and use my invention, I will now proceed to describe the manner in which the same is constructed and applied.

I will suppose that a series of twenty imitations of wood carvings of one pattern are required. I take twenty pieces of ordinary veneer, of the description of wood and size required, each of which I polish on one side, removing all the saw-marks and other imperfections, so as to leave a smooth and even surface, the opposite side being made even and partially smoothed with sand-paper. I now take each piece of veneer separately and paste on its back a sheet of paper, and leave the whole of the so treated twenty pieces a sufficient time to allow the wood to partially absorb the moisture of the paste. While the said veneers are yet damp, I place them, separately, between a pair of heated matching-plates or dies, (having the intended relief figure on one and its counterpart in the other plate,) with the papered back of the veneer in contact with the relief, and subject them to a sudden and strong pressure for a few minutes by means of any suitable press. As the figure in relief on the one plate is thus forced up toward its counterpart in the other, the veneer being between, the heat of the plates or dies has a tendency, through the moisture already imparted to the veneer by the paste, to reduce the said veneer to a partially-plastic condition, yielding readily to the action of the relief figure on the one plate until the latter has, by the pressure applied, forced and compressed the wood into the cavities of its counterpart in the other plate. Each veneer as thus treated is allowed to remain a sufficient length of time between the said dies or plates to cause the wood, paste, and paper to become hard or "set"—an effect which results in a few minutes from the heat communicated by the said plates or dies—when it is removed having an exact copy of the figure in the counterpart plate produced in relief on its polished side. The remainder of the twenty veneers are now submitted in succession to the action of the dies in the same manner and with like results.

It should be here observed that the paste and paper on the backs of the veneers perform two important offices: first, with the aid of the heated plates or dies, that of reducing the veneers to a partially-plastic condition, which allows them to yield to the dies without splitting the wood; and, secondly, forming after the dies have efficiently pressed the veneers, a substance at the back, solidified by heat and firmly attached to the veneer, whereby the said reliefs are prevented from collapsing or altering in form or fullness and distinctness of outline after the veneer has been removed from between the dies—an important feature in view of the requirements of trade, as these improved veneers are intended to be kept on sale for subsequent application at any time.

I have found by experiment that ordinary flour-paste is well adapted for the purpose herein specified, and that in treating veneers of the usual or ordinary woods the paper used should be of about the consistency and body of common letter-paper.

In the application of these veneers the paper should be first dampened and removed therefrom. Then the cavities in their backs are filled up with any suitable plastic substance—as, for instance, sand or marble-dust and glue—and smoothed off, so as to give them an even flat surface or back. They are then secured to the article to be ornamented by means of glue in the usual manner or otherwise.

I wish it to be understood that, although I have described one particular process of heating or preparing the veneers before the embossments are produced thereon, I do not desire to confine myself to that process in every minutia, as the same may be modified or equivalents substituted; but

I claim—

As a new manufacture, the embossed veneers described, the same being adapted for subsequent application in the construction and ornamenting of furniture and other articles to which veneers are or may be applicable.

ISRAEL AMIES.

Witnesses:

BENJ. MORRISON,
JAS. R. OLDDEN.